Patented Aug. 12, 1952

2,606,887

UNITED STATES PATENT OFFICE 2,606,887

MODIFIED PHENOL-FURFURAL MOLDING COMPOSITIONS AND PROCESS OF MAKING SAME

Stephen Frederick Pearce, Upper Tooting, London, England, assignor to Imperial Chemical Industries Limited, a corporation of Great Britain No Drawing. Application April 5, 1949, Serial No. 85,717. In Great Britain April 21, 1948

10 Claims. (Cl. 260—54)

This invention relates to the production of improved thermosetting moulding compositions and, more particularly, to the production of improved thermosetting phenol-furfural moulding compositions.

By the expression "thermosetting phenol-furfural moulding compositions" as used hereinafter throughout the specification we mean filled or unfiled resin compositions, in a state of sub-division suitabe for feeding into moulds used in the art, in which the resin components are a permanently fusible, soluble phenol-furfural condensation product and a methylene donating hardening agent.

By "methylene donating hardening agents" we mean substances such as hexamethylene tetramine, which provide the additional methylene groups required to convert the fusible, soluble resin to the infusible, insoluble state.

Suitable phenols for the production of fusible, soluble phenol-furfural resins include phenol, m-cresol, resorcinol, 3:5-xylenol and commercially available mixtures of these and their isomers.

Thermosetting moulding compositions are produced by blending together the resin and the hardening agent and, if desired, one or more fillers, a mould lubricant, which may be, for example, zinc stearate, any other desired ingredients such as basic materials, for example, lime or magnesia, plasticisers and dyes and/or pigments, and thereafter malaxating the blend, for example, in a "Banbury" mixer and/or on heated rolls until the composition has the desired "flow" and the constituents of the blend are well mixed together. The compositions are then converted to a form suitable for loading into moulds or compacting in pelleting machines. Suitable fillers for such compositions include woodflour, paper, cotton in various forms, mica, asbestos and other inert materials. If compositions suitable for the production of high impact strength mouldings are desired, fillers in the form of string or diced fabric may be used. The compositions may then be prepared by mixing the resin, which may be in the form of a spirit solution or aqueous suspension, and hardening agent with the fillers and other ingredients in a suitable mixer such as an edge runner mill or a Baker-Perkins mixer until the fillers are well impregnated with the resin and thereafter drying, heating being continued until the compositions have the required "flow."

Mouldings prepared from phenol-furfural moulding compositions, especially those containing resins made from commercially available mixtures of cresols and xylenols, often suffer from the disadvantages of being slow to cure and being difficult to remove from hot moulds because they tend to be soft at the temperature of the mould. This softness may lead to deformation and damage to the moulding during removal from the mould. The mouldings may also stick to the mould and may even require the use of considerable force in their extraction therefrom. These difficulties, as will be readily appreciated by those skilled in the art, cause a decreased speed of production and increased cost of articles moulded from such compositions.

In the copending United States application Serial No. 13,943 filed March 9, 1948 it is disclosed that the above disadvantages which also occur in phenol-formaldehyde moulding compositions, can be overcome therein by the incorporation of a boric acid. We have now found that these disadvantages in phenol-furfural moulding compositions can also be overcome by the incorporation of a boric acid therein at any stage during its manufacture.

An object of the present invention is to provide a process for the production of improved phenol-furfural moulding powders. Another object is to provide a process for the production of phenol-furfural moulding compositions having increased rates of cure. A further object is to provide a process for the production of phenol-furfural moulding compositions having increased plasticity when subjected to moulding conditions. A still further object is to provide a process for the production of phenol-furfural moulding compositions which give mouldings having increased hot strength and improved electrical properties. Other objects will appear hereinafter.

According to the present invention these objects are accomplished by a process comprising incorporating a boric acid into a phenol-furfural moulding composition, as hereinbefore defined, at any stage during its production.

The boric acid is used in amount from 0.1 to 20 per cent and preferably from 1 to 12 per cent by weight of the resin plus methylene donating hardening agent and may be added to the other ingredients in any desired manner, for example, it may be added either in a dry state or in solution to the fusible, soluble resin or to any of the other ingredients. Alternatively, it may be added to the blended material before or during malaxation. It is preferred, however, to add the boric acid at an initial blending stage of the resin with the other ingredients as this method is most convenient for plant operation. Boric acid in a pure form such as, for example, orthoboric acid conforming to the standard laid down in the British Pharmacopoeia, is preferred because the impure acids often contain compounds which cause adverse effects. Orthoboric acid B(OH)$_3$ is preferred as being most effective in achieving the object of this invention.

It is also preferred during the working of the compositions of this invention to incorporate small amounts of water, as this enables the optimum benefit to be obtained from the boric acid. This water, the bulk of which is lost during working, may be used in amount from 2 to 6 per cent by weight of the composition.

A valuable feature of the present invention is that it allows the use of cresol and/or xylenol mixtures which are low in content of the meta isomers for the production of satisfactory moulding compositions. The use of such low grade materials has not hitherto been possible as resins produced therefrom have not been sufficiently reactive.

Our invention is further illustrated by the following example, in which all parts are by weight, but it is to be understood that our invention is in no way limited by this example.

EXAMPLE

*Preparation of resin*

Dry phenol and furfural were condensed in a molecular ratio of 1.0 to 0.83 by heating in the presence of 0.3 gm. of potassium carbonate per gram-molecule of phenol. The mixture was heated slowly under conditions which, while retaining the furfural, allowed the water to distil off slowly as formed. The temperature was raised to 200–205° C. and distillation continued until the requisite amount of water had been removed. The resin was then cooled and disintegrated and had a melting point of 65° C.

*Preparation of moulding compositions*

Two moulding compositions were made by compounding together on hot rolls the ingredients shown in the following table, which also shows the moulding properties of the compositions. The properties given are (a) a cup flow (as determined by the method of B. S. S. 771), (b) cup cure (minimum time to produce a blister-free moulding in the B. S. S. 771 cup flow test, the time being measured from the moment the mould is completely closed to the moment when the mould is opened) and (c) the "ease of deformation" of the hot moulding immediately on removal from the mould. Note: The "ease of deformation" is an arbitrary measure of the hot strength of the moulding and is determined by the following method. The hot cup is taken straight from the mould and placed immediately on its side in an apparatus containing a suitably shaped depression such that the cup lies with its axis of symmetry in a horizontal plane. A loaded plunger (total load 10.5 lbs.) is then lowered on to the upper surface of the cup near the open end, the plunger being constructed of a semi-circular piece of $\frac{1}{16}$ in. thick mild steel plate, having a radius of curvature of $\frac{3}{8}$ in. The point of contact of the plunger is $\frac{3}{4}$ in. from the open end of the cup and vertically above the central axis. Under this deforming load, the sides of the cup are partially squeezed together. The decrease in diameter of the open end, calculated as a percentage of the original diameter, is termed the "ease of deformation."

TABLE

|  | Parts | |
| --- | --- | --- |
| Phenol-furfural resin | 42.0 | 42.0 |
| Woodflour | 53.5 | 53.5 |
| Hexamethylene tetramine | 3.0 | 3.0 |
| Zinc stearate | 0.5 | 0.5 |
| Nigrosine | 1.0 | 1.0 |
| Boric acid | | 3.0 |
| Water | 4.0 | 4.0 |
| Total | 104.0 | 107.0 |
| Cup flow (secs.) | 14 | 14 |
| Cup cure at 163° C. (secs.) | 85 | 67.5 |
| Ease of deformation (after 75 secs. cure) | 25 | 12.5 |

I claim:

1. A process as set forth in claim 9 wherein the boric acid is used in an amount from 0.1 to 20% by weight of the fusible soluble resin plus the hexamethylene tetramine.

2. A process as set forth in claim 9 wherein the boric acid is used in an amount from 1 to 12% by weight of the fusible soluble resin plus hexamethylene tetramine.

3. A process as set forth in claim 9 wherein the boric acid is incorporated during the initial blending of the fusible soluble resin with the hexamethylene tetramine.

4. A process as set forth in claim 9 wherein a small amount of water is incorporated during the working of the composition.

5. A process as set forth in claim 9 wherein water in an amount of from 2 to 6% by weight of the composition is incorporated.

6. A new and improved two-stage phenol-furfural molding composition as set forth in claim 10 wherein said boric acid is present in an amount of from 0.1 to 20% by weight of the fusible soluble resin plus hexamethylene tetramine.

7. A new and improved two-stage phenol-furfural molding composition as set forth in claim 10 wherein said boric acid is present in an amount from 1 to 12% by weight of the fusible soluble resin plus hexamethylene tetramine.

8. A new and improved two-stage phenol-furfural molding composition as set forth in claim 10 wherein said boric acid is present in an amount of from 0.1 to 20% by weight of the fusible soluble resin plus the hexamethylene tetramine and wherein water is present in an amount of from 2 to 6% by weight of the molding composition.

9. A process for the production of a new and improved two-stage phenol-furfural molding composition in which the two-stage resin consists of a fusible, soluble phenol-furfural resin and hexamethylene tetramine which comprises intimately admixing boric acid with these ingredients.

10. A new and improved two-stage phenol-furfural molding composition comprising an intimate mixture of a fusible, soluble phenol-furfural resin, hexamethylene tetramine and boric acid.

STEPHEN FREDERICK PEARCE.

REFERENCES CITED

The following references are of record in the file of this patent:

UNITED STATES PATENTS

| Number | Name | Date |
| --- | --- | --- |
| 2,363,893 | Monier | Nov. 28, 1944 |